(12) United States Patent
Takeyasu et al.

(10) Patent No.: US 11,023,782 B2
(45) Date of Patent: Jun. 1, 2021

(54) OBJECT DETECTION DEVICE, VEHICLE CONTROL SYSTEM, OBJECT DETECTION METHOD, AND NON-TRANSITORY COMPUTER READABLE MEDIUM

(71) Applicant: TOYOTA JIDOSHA KABUSHIKI KAISHA, Toyota (JP)

(72) Inventors: Satoshi Takeyasu, Musashino (JP); Daisuke Hashimoto, Chofu (JP); Kota Hirano, Edogawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 16/555,057

(22) Filed: Aug. 29, 2019

(65) Prior Publication Data

US 2020/0090004 A1    Mar. 19, 2020

(30) Foreign Application Priority Data

Sep. 14, 2018  (JP) .............................. JP2018-172207

(51) Int. Cl.
*G06K 9/00* (2006.01)
*G08G 1/01* (2006.01)
(Continued)

(52) U.S. Cl.
CPC ......... *G06K 9/6262* (2013.01); *G05D 1/0212* (2013.01); *G05D 1/0238* (2013.01);
(Continued)

(58) Field of Classification Search
USPC ....... 382/100, 103, 104, 106, 155–158, 162, 382/168, 173, 181, 199, 209, 224, 232,
(Continued)

(56) References Cited

U.S. PATENT DOCUMENTS

| | | | |
|---|---|---|---|
| 2018/0300880 A1* | 10/2018 | Fan ...................... | G06K 9/4628 |
| 2019/0050995 A1* | 2/2019 | Tasaki .................. | G06T 1/0007 |

(Continued)

OTHER PUBLICATIONS

Wei Liu et al., "SSD: Single Shot MultiBox Detector", ECCV2016, 2016.

(Continued)

*Primary Examiner* — Seyed H Azarian
(74) *Attorney, Agent, or Firm* — Sughrue Mion, PLLC

(57) ABSTRACT

An object detection device 30 comprises a position region detecting part 31 using a first neural network to detect a position region of an object in the image, a large attribute identification part 32 configured using a second neural network to identify a large attribute of the object, a small attribute identification part 33 using a third neural network to identify a small attribute of the object, and an object judging part 34 judging a result of detection of the object. The object judging part is configured to judge that a result of identification of the small attribute is the result of detection if a confidence of the result of identification of the small attribute is equal to or more than a threshold value, and judge the result of detection based on a result of identification of the large attribute if the confidence is less than the threshold value.

6 Claims, 8 Drawing Sheets

(51) Int. Cl.
G06K 9/62 (2006.01)
G06T 7/70 (2017.01)
G05D 1/02 (2020.01)

(52) U.S. Cl.
CPC ............ *G06K 9/00818* (2013.01); *G06T 7/70* (2017.01); *G05D 2201/0213* (2013.01); *G06K 2209/23* (2013.01); *G06T 2207/20084* (2013.01)

(58) Field of Classification Search
USPC ......... 382/254, 276, 291, 312; 340/934, 936
See application file for complete search history.

(56) References Cited

U.S. PATENT DOCUMENTS

| | | | | |
|---|---|---|---|---|
| 2019/0361454 | A1* | 11/2019 | Zeng | B60W 50/0098 |
| 2020/0175352 | A1* | 6/2020 | Cha | G06N 3/0454 |
| 2020/0364473 | A1* | 11/2020 | Silver | B60W 40/105 |
| 2021/0027111 | A1* | 1/2021 | Taralova | G06N 3/04 |

OTHER PUBLICATIONS

Shaoqing Ren et al., "Faster R-CNN: Towards Real-Time Object Detection with Region Proposal Networks", NIPS, 2015.

* cited by examiner

OBJECT DETECTION DEVICE, VEHICLE CONTROL SYSTEM, OBJECT DETECTION METHOD, AND NON-TRANSITORY COMPUTER READABLE MEDIUM

FIELD

The present invention relates to an object detection device, a vehicle control system, object detection method, and a non-transitory computer-readable medium storing an object detection use computer program.

BACKGROUND

Known in the past has been the technique of detecting an object from an image generated by a camera etc. For example, NPLs 1 and 2 describes that it is possible to use a neural network to improve the accuracy of detection of an object.

In such a neural network, predetermined parameters (weight etc.,) at each layer of the neural network are adjusted in advance by learning. In learning, an image with a true label including the name of a known object is used as training data. It is possible to use a large number of training data to train a neural network and thereby raise the accuracy of detection of an object.

CITATION LIST

Nonpatent Literature

[NPL 1] Wei Liu et al., "SSD: Single Shot MultiBox Detector", ECCV2016, 2016
[NPL 2] Shaoqing Ren et al., "Faster R-CNN: Towards Real-Time Object Detection with Region Proposal Networks", NIPS, 2015

SUMMARY

Technical Problem

However, it is difficult to prepare the large number of training data for rare objects, so the accuracy of detection of the objects falls. Further, the accuracy of detection of an object falls even if glare, motion blur, etc., causes an object in an image to become unclear.

Therefore, an object of the present invention is to suppress that an object remains undetected in a situation where detection of the object is difficult.

Solution to Problem

The summary of the present disclosure is as follows.

(1) An object detection device comprising a position region detecting part configured to use a first neural network to detect a position region of an object in the image, a large attribute identification part configured to use a second neural network to identify a large attribute of the object, a small attribute identification part configured to use a third neural network to identify a small attribute of the object which is a lower concept of the large attribute, and an object judging part configured to judge a result of detection of the object, wherein the object judging part is configured to judge that a result of identification of the small attribute is the result of detection if a confidence of the result of identification of the small attribute by the small attribute identification part is equal to or more than a threshold value, and judge the result of detection based on a result of identification of the large attribute if the confidence is less than the threshold value.

(2) The object detection device described in above (1), wherein the object judging part is configured to judge the result of detection based on the result of identification of the large attribute and a distribution of confidence of the small attribute if the confidence is less than the threshold value.

(3) The object detection device described in above (1) or (2), wherein the object is a sign.

(4) The object detection device described in above (3), wherein the object judging part is configured to judge that a speed limit sign of a slowest speed in candidates of the small attribute is the result of detection if the confidence is less than the threshold value and the result of identification of the large attribute by the large attribute identification part is a speed limit sign.

(5) The object detection device described in any one of above (1) to (4), wherein the object judging part is configured to judge that the result of identification of the large attribute is the result of detection if the confidence is less than the threshold value.

(6) A vehicle control system comprising an object detection device according to any one of above (1) to (5), a drive planning part configured to create a drive plan of a vehicle based on the result of detection of the object, and a vehicle control part configured to control the vehicle so that the vehicle drives in accordance with a drive plan prepared by the drive planning part.

(7) A method of detection of an object comprising using a first neural network to detect a position region of an object in an image, using a second neural network to identify a large attribute of the object, using a third neural network to identify a small attribute of the object which is a lower concept of the large attribute, and, when a confidence of a result of identification of the small attribute is equal to or more than a threshold value, judging that the result of identification of the small attribute is a result of detection of the object and, when the confidence is less than the threshold value, judging the result of detection based on a result of identification of the large attribute.

(8) A non-transitory computer-readable medium storing an object detection use computer program making a computer use a first neural network to detect a position region of an object in an image, use a second neural network to identify a large attribute of the object, use a third neural network to identify a small attribute of the object which is a lower concept of the large attribute, and, when a confidence of a result of identification of the small attribute is equal to or more than a threshold value, judge that the result of identification of the small attribute is a result of detection of the object and, when the confidence is less than the threshold value, judge the result of detection based on a result of identification of the large attribute.

Advantageous Effects of Invention

According to the present invention, it is possible to suppress that an object remains undetected in a situation where detection of the object is difficult.

DESCRIPTION OF EMBODIMENTS

Figure 1:
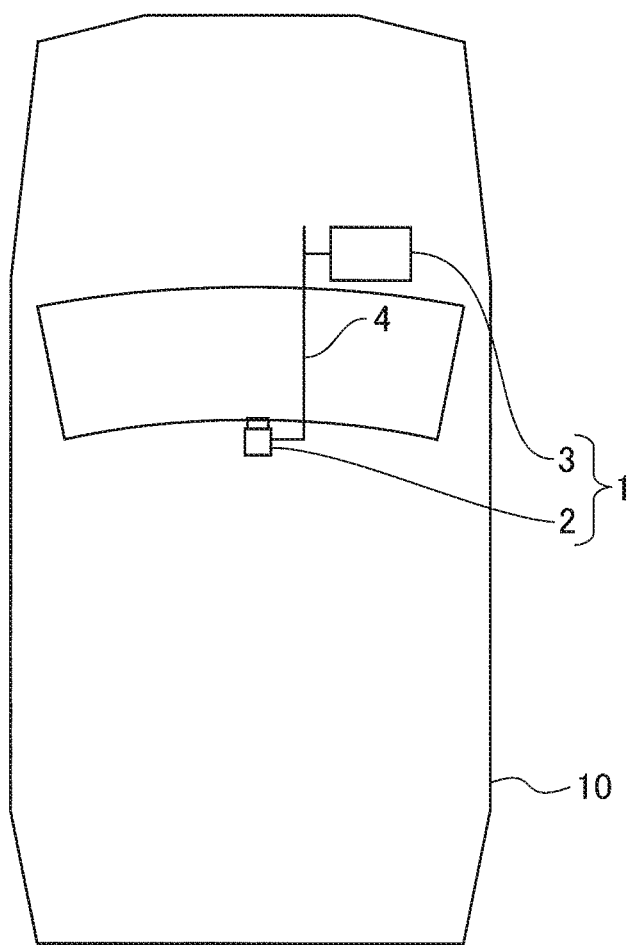
FIG. 1 is a view schematically showing the configuration of a vehicle control system according to the present embodiment.

Below, referring to the drawings, an object detection device, a vehicle control system, object detection method, and A non-transitory computer-readable medium according to embodiments of the present invention will be explained. Note that, in the following explanation, similar component elements are assigned the same reference notations.

<Vehicle Control System>

FIG. 1 is a view schematically showing the configuration of a vehicle control system according to the present embodiment. The vehicle control system 1 is mounted in a vehicle 10 and controls the vehicle 10. In the present embodiment, the vehicle control system 1 performs automated driving of the vehicle 10.

The vehicle control system 1 is provided with a camera 2 and electronic control unit (ECU) 3. The camera 2 and the ECU 3 are connected to be able to communicate with each other through an in-vehicle network 4 compliant with a standard such as the CAN (Controller Area Network).

The camera 2 captures an image of a predetermined range and generates an image of the predetermined range. The camera 2 includes a lens and an imaging device and, for example, is a CMOS (complementary metal oxide film semiconductor) camera or CCD (charge coupled device) camera.

In the present embodiment, the camera 2 is provided at the vehicle 10 and captures the surroundings of the vehicle 10. Specifically, the camera 2 is provided at the inside of the vehicle 10 and captures the region in front of the vehicle 10. For example, the camera 2 is provided at a back surface of a room mirror of the vehicle 10. The camera 2 captures an image of the front region of the vehicle 10 at predetermined imaging intervals (for example, 1/30 second to 1/10 second) while the ignition switch of the vehicle 10 is on, and generates an image of the front region. The image generated by camera 2 is sent through the in-vehicle network 4 from the camera 2 to the ECU 3. The image generated by the camera 2 is a color image or gray image.

Figure 2:
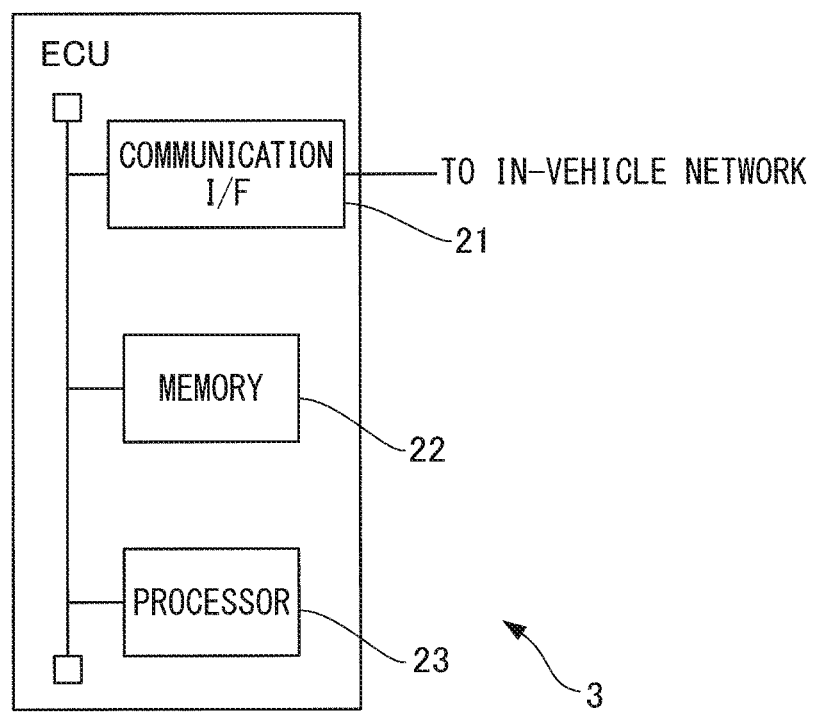
FIG. 2 is a view of a hardware configuration of an ECU.

FIG. 2 is a view of a hardware configuration of the ECU 3. The ECU 3 includes a communication interface 21, memory 22, and processor 23 and performs various control of the vehicle 10. The communication interface 21 and memory 22 are connected through signal lines to the processor 23.

The communication interface 21 is an interface circuit for connecting the ECU 3 to the in-vehicle network 4. That is, the communication interface 21 is connected through the in-vehicle network 4 to the camera 2. The communication interface 21 receives an image from the camera 2 and transfers the received image to the processor 23.

The memory 22, for example, has a volatile semiconductor memory and nonvolatile semiconductor memory. The memory 22 stores various data etc., used when the processor 23 performs various processing. For example, the memory 22 stores an image generated by the camera 2, map information, etc.

The processor 23 has one or more CPUs (central processing unit) and their peripheral circuits. The processor 23 performs processing for vehicle control including processing for object detection each time receiving an image from the camera 2. Note that, the processor 23 may further have processing circuits such as logic processing units or numeric processing units.

Figure 3:
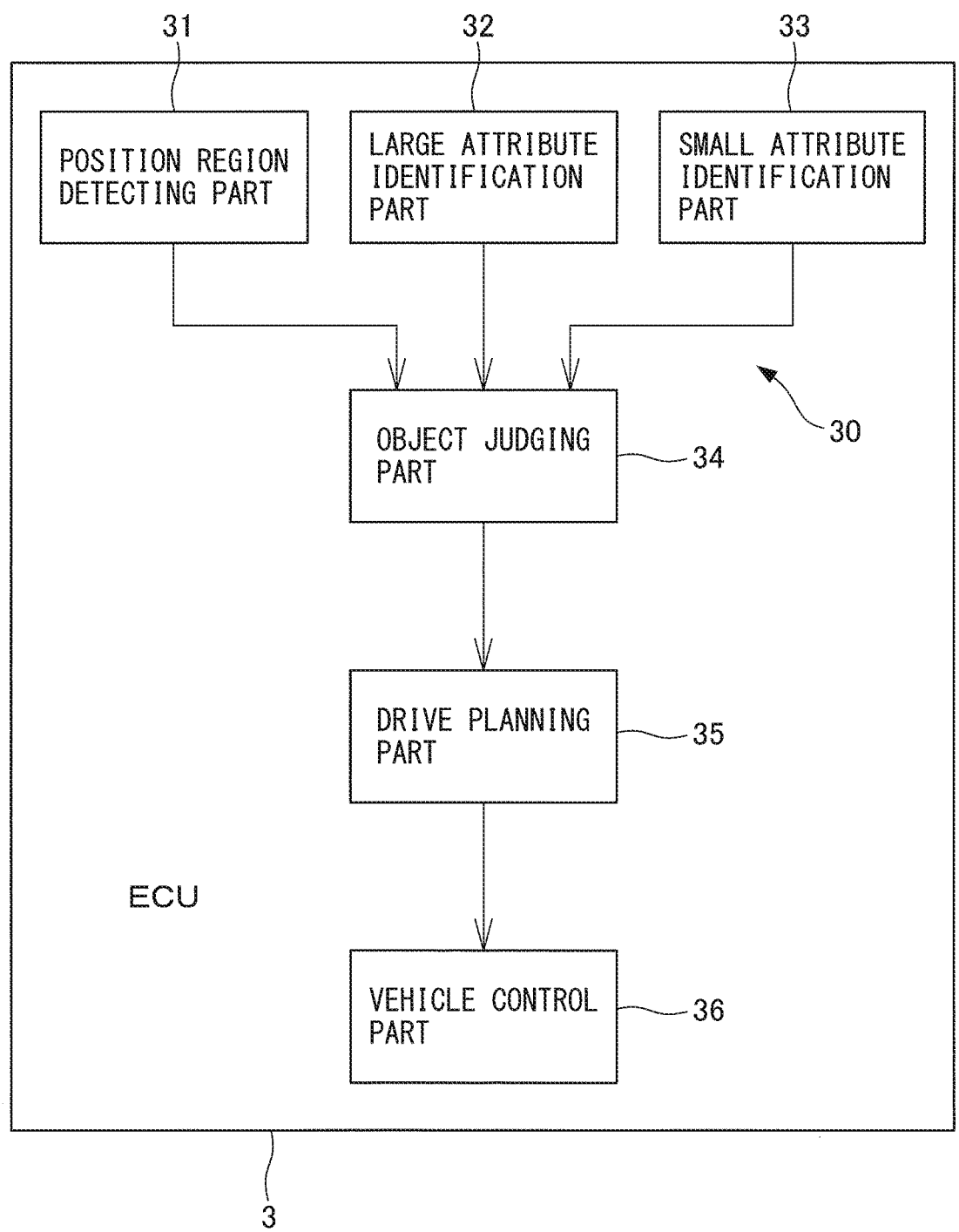
FIG. 3 is a block diagram of functions of the ECU relating to processing for vehicle control.

FIG. 3 is a functional block diagram of the ECU 3 relating to processing for vehicle control. The vehicle control system 1 is provided with the camera 2, an object detection device 30, drive planning part 35, and vehicle control part 36. The object detection device 30 receives an image from the camera 2 and detects an object in the image generated by the camera 2. The drive planning part 35 creates a drive plan of a vehicle 10 based on the result of detection of an object by the object detection device 30. The vehicle control part 36 controls the vehicle 10 so that the vehicle 10 drives according to the drive plan created by the drive planning part 35.

<Processing for Object Detection>

The object detection device 30 uses a neural network to detect an object in an image. In the neural network, predetermined parameters (weight etc.,) at each layer of the neural network are adjusted in advance by learning. In learning, images with true labels including the names of known objects are used as training data. It is possible to use a large number of training data to train a neural network and thereby raise the accuracy of detection of an object.

However, it is difficult to prepare the large number of training data for rare objects, so the accuracy of detection of an object falls. Further, the accuracy of detection of an object falls even if glare, motion blur, etc., causes an object in an image to become unclear. If it is not possible to obtain a grasp of the surrounding environment of the vehicle 10 due to an object remaining undetected, it becomes difficult for the vehicle control system 1 to continue automated driving of the vehicle 10.

On the other hand, even if details of an object cannot be detected, sometimes an outline of the object can be detected. For example, even if the type of the vehicle in the image (passenger car, truck, bus, etc.) cannot be detected, sometimes the fact that the object is a vehicle can be detected. In this case, it is possible to predict an object from the outline of the object to suppress that the object remains undetected. For this reason, in the present embodiment, the object detection device 30 separately identifies a small attribute and large attribute of an object to thereby judge the final result of detection of the object.

A small attribute of an object is a lower concept of a large attribute of an object. For example, if a large attribute of an object is a vehicle, a small attribute of the object is a passenger car, truck, bus, etc. Further, if a large attribute of an object is a speed limit sign prescribing an allowable upper limit speed, a small attribute of the object is a speed limit sign of 30 km/h, 60 km/h, 80 km/h, etc. Further, if a large attribute of an object is a warning sign (yellow diamond shaped sign in Japan), a small attribute of the object is a sign warning of the existence of a railroad crossing, existence of a traffic light, danger of falling rocks, reduction of the number of lanes, etc. Further, if a large attribute of an object is a fallen object, a small attribute of the object is wood, cardboard, a tire, magazine, bedding, etc.

As shown in FIG. 3, the object detection device 30 is provided with a position region detecting part 31, a large attribute identification part 32, a small attribute identification part 33, and an object judging part 34. The position region detecting part 31 detects a position region of an object in the image. The large attribute identification part 32 identifies a large attribute of an object in the image. The small attribute identification part 33 identifies a small attribute of an object in the image. The object judging part 34 judges the result of detection of an object based on the results of detection of the large attribute and the small attribute of the object.

For example, the object being detected by the object detection device 30 is a sign. Unlike a vehicle having tires, bumpers, windows, lights, or numerous other features, a sign does not have numerous features. For this reason, in a detection method not using a neural network, if the features of the numbers or graphics are unclear, the sign will remain undetected. On the other hand, in the object detection device 30 using a neural network, even if the features of the numbers or graphics are unclear, often an object is detected as a sign based on other fine features. For this reason, by using the large attribute identification part 32 to identify the large attribute of an object, it is possible to keep an object from remaining undetected even when there are few features like a sign.

In the present embodiment, the ECU 3 has the position region detecting part 31, the large attribute identification part 32, the small attribute identification part 33, the object judging part 34, the drive planning part 35, and the vehicle control part 36. These functional blocks are, for example, functional modules realized by a computer program running on the processor 23 of the ECU 3. Note that, these functional blocks may be dedicated processing circuits provided in the processor 23.

Figure 4:
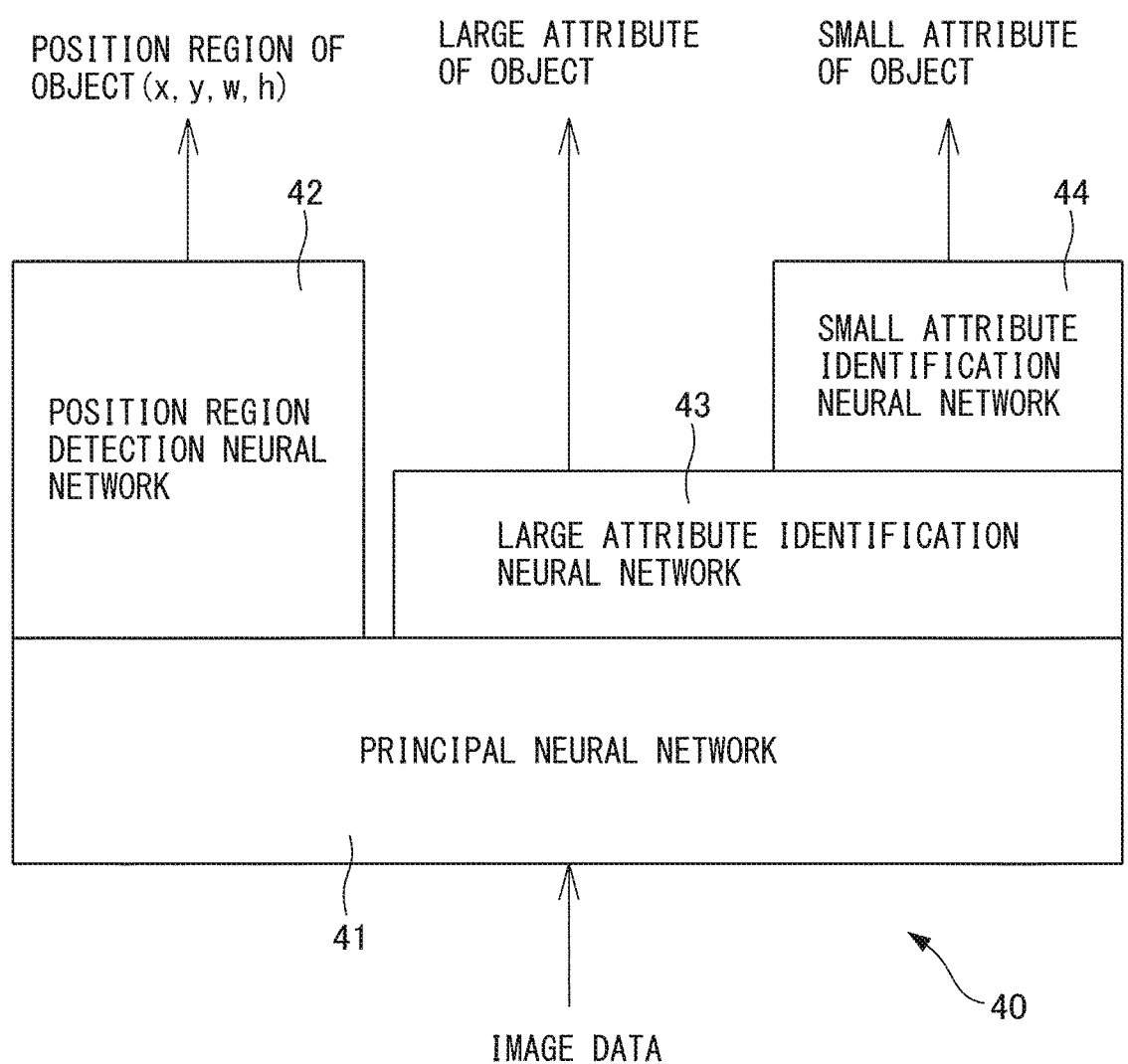
FIG. 4 is a view showing one example of the configuration of a neural network utilized as a classifier.

The position region detecting part 31, the large attribute identification part 32, and the small attribute identification part 33 of the object detection device 30 form a classifier detecting an object by a neural network. FIG. 4 is a view showing one example of the configuration of a neural network utilized as a classifier. The classifier 40 is a deep neural network having a plurality of hidden layers between an input layer and output layer.

The classifier 40 has a principal neural network (below, referred to as a "principal NN") 41, a position region detection neural network (below, referred to as a "position region detection NN") 42, a large attribute identification neural network (below, referred to as a "large attribute identification NN") 43, and a small attribute identification neural network (below, referred to as a "small attribute identification NN") 44.

The position region detection NN 42 is connected in series to the principal NN 41 and is arranged at a downstream side (output side) from the principal NN 41. The large attribute identification NN 43 is connected in series to the principal NN 41 and is arranged at a downstream side from the principal NN 41. The small attribute identification NN 44 is connected in series to the large attribute identification NN 43 and is arranged at a downstream side from the principal NN 41 and large attribute identification NN 43. The large attribute identification NN 43 is arranged between the principal NN 41 and the small attribute identification NN 44.

The principal NN 41 is a base network having an input layer to which an image is input. For example, the principal NN 41 is configured as a convolutional neural network (CNN) having a plurality of convolutional layers. The principal NN 41 may include a pooling layer provided for one convolutional layer or a plurality of convolutional layers. Further, the principal NN 41 may include one or more fully connected layers. For example, the principal NN 41 can have a configuration similar to the VGG 16 which is the base network of the Single Shot MultiBox Detector (SSD) described in NPL 1. Further, the principal NN 41 may have a configuration similar to a ResNet (Residual Network), AlexNet, or other CNN architecture.

The output of the principal NN 41 is input to the position region detection NN 42. The position region detection NN 42 has an output layer outputting the position region of an object in an image. The output layer of the position region detection NN 42 outputs a bounding box showing the position region of the object, specifically the center coordinates (x, y), width "w", and height "h" of the bounding box. The bounding box is expressed as a circumscribing rectangle surrounding an object in the image.

Further, the output of the principal NN 41 is input to the large attribute identification NN 43. The large attribute identification NN 43 has an output layer outputting a large attribute of an object in the image. The output layer of the large attribute identification NN 43 outputs the result of detection of the large attribute (that is, the type of the large attribute) and the confidence of the result of detection. The activation function of the output layer is for example a softmax function.

The output of the large attribute identification NN 43 is input to the small attribute identification NN 44. The small attribute identification NN 44 has an output layer outputting a small attribute of the object in the image. The output layer of the small attribute identification NN 44 outputs the result of detection of the small attribute (that is, the type of small attribute) and the confidence of the result of detection. The activation function of the output layer is for example a softmax function.

For example, the position region detection NN 42, the large attribute identification NN 43, and the small attribute identification NN 44 are respectively convolutional neural networks (CNN) having pluralities of convolutional layers. For example, the position region detection NN 42, the large attribute identification NN 43, and the small attribute identification NN 44 respectively are configured to generate pluralities of feature maps. Note that, the position region detection NN 42, the large attribute identification NN 43, and the small attribute identification NN 44 respectively may also include pooling layers provided for one convolutional layer or a plurality of convolutional layers. Further, the position region detection NN 42, the large attribute identification NN 43, and the small attribute identification NN 44 may respectively include one or more fully connected layers.

The position region detecting part 31 uses the first neural network to detect the position region of an object in the image. In the example of FIG. 4, the first neural network is a deep neural network and is comprised of the principal NN 41 and the position region detection NN 42. The large attribute identification part 32 uses the second neural network to identify the large attribute of an object in the image. In the example of FIG. 4, the second neural network is a deep neural network and is comprised of the principal NN 41 and the large attribute identification NN 43. The small attribute identification part 33 uses a third neural network to identify a small attribute of an object in the image. In the example of FIG. 4, the third neural network is a deep neural network and is comprised of the principal NN 41, the large attribute identification NN 43, and the small attribute identification NN 44.

For example, the first neural network, the second neural network, and the third neural network can respectively have configurations similar to a Single Shot MultiBox Detector (SSD), Faster R-CNN, You Only Look Once (YOLO), etc. so that the accuracy of detection of the object is high and the speed of detection of the object becomes faster.

In the first neural network, the second neural network, and the third neural network, learning is used to improve the accuracy of detection. In learning, an image with a true label is used as the training data. A true label includes a position region, a large attribute, and a small attribute of an object in the image.

Figure 5:
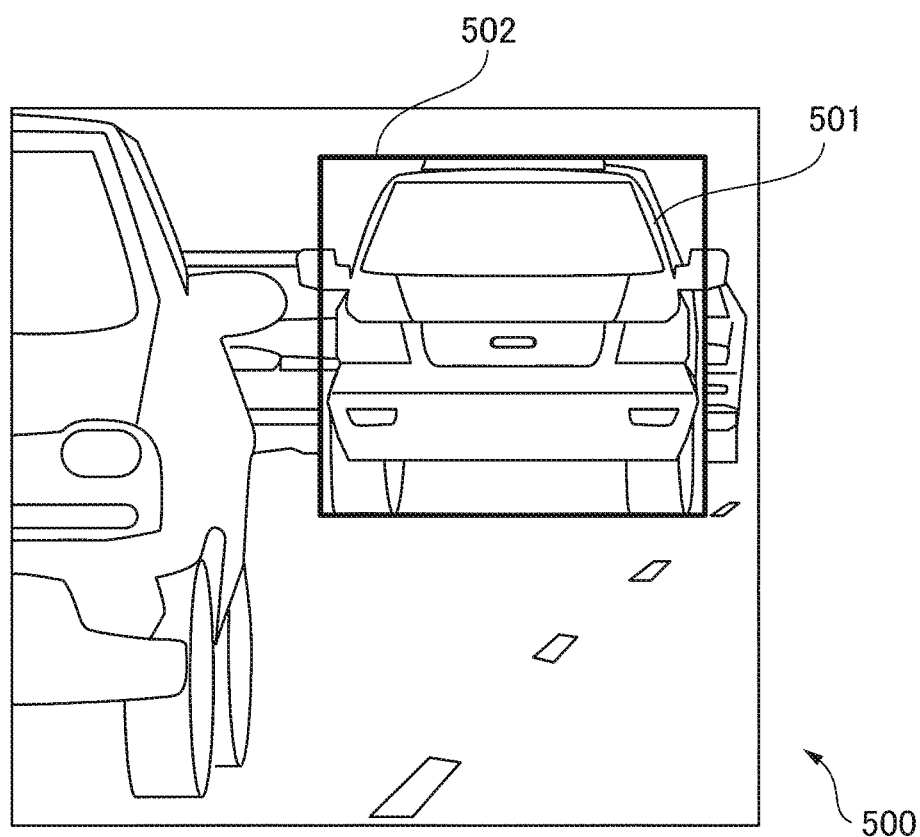
FIG. 5 is a view showing one example of training data when an object being detected is a vehicle.

FIG. 5 shows one example of training data when the object being detected is a vehicle. In this example, the training data (training image) 500 includes as a true label the center coordinates (x, y), width "w", and height "h" of the bounding box 502 showing the position region of the object 501, the large attribute of the object 501 (in this example, a vehicle), and the small attribute of the object 501 (in this example, a passenger car).

Figure 6:
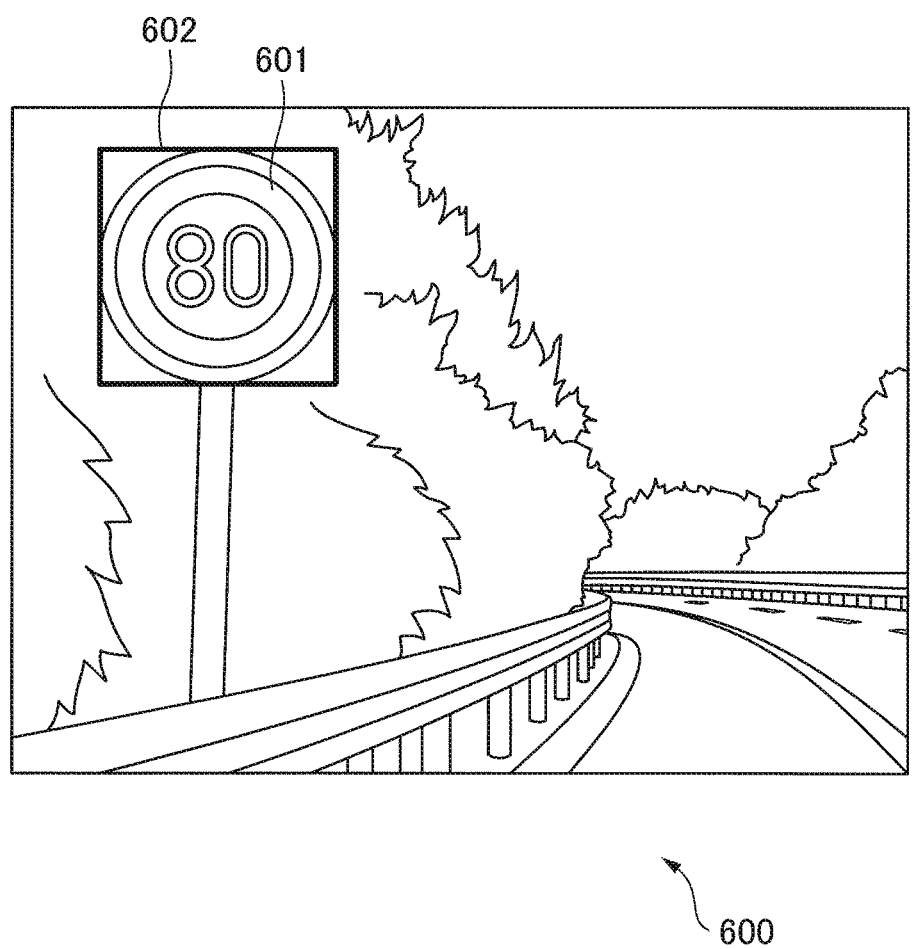
FIG. 6 is a view showing one example of training data when an object being detected is a sign.

FIG. 6 shows one example of training data when the object being detected is a sign. In this example, the training data (training image) 600 includes as a true label the center coordinates (x, y), width "w", and height "h" of the bounding box 602 showing the position region of the object 601, the large attribute of the object 601 (in this example, a speed limit sign), and the small attribute of the object 601 (in this example, an 80 km/h speed limit sign).

The learning operations of the first neural network, second neural network, and third neural network are respectively performed using the large number of training data such as shown in FIG. 5 and FIG. 6 by a learning technique such as error back propagation. In error back propagation, the weights of the layers of the neural networks are updated so that the outputs of the neural networks approach the true labels, that is, so that the values of the loss functions become smaller. In the learning operations of the first neural network, the second neural network, and the third neural network, the same training data can be used. For this reason, the learning operations of these neural networks can be efficiently performed.

As shown in FIG. 3, the outputs of the position region detecting part 31, the large attribute identification part 32, and the small attribute identification part 33 are respectively input to the object judging part 34. The object judging part 34 judges the result of detection of the object at the position region detected by the position region detecting part 31 based on the result of detection of the large attribute by the large attribute identification part 32 and the result of detection of the small attribute by the small attribute identification part 33.

Specifically, the object judging part 34 judges that the result of detection of the small attribute is the result of detection of the object if the confidence of the result of detection of the small attribute by the small attribute identification part 33 is equal to or more than a threshold value. On the other hand, if the confidence of the result of detection of the small attribute by the small attribute identification part 33 is less than the threshold value, the object judging part 34 judges the result of detection based on the result of detection of the large attribute by the large attribute identification part 32. By doing this, even if the confidence of the result of detection of the small attribute becomes low in a situation where detection of the object is difficult, it is possible to keep the object from remaining undetected.

<Processing for Vehicle Control>

Figure 7:
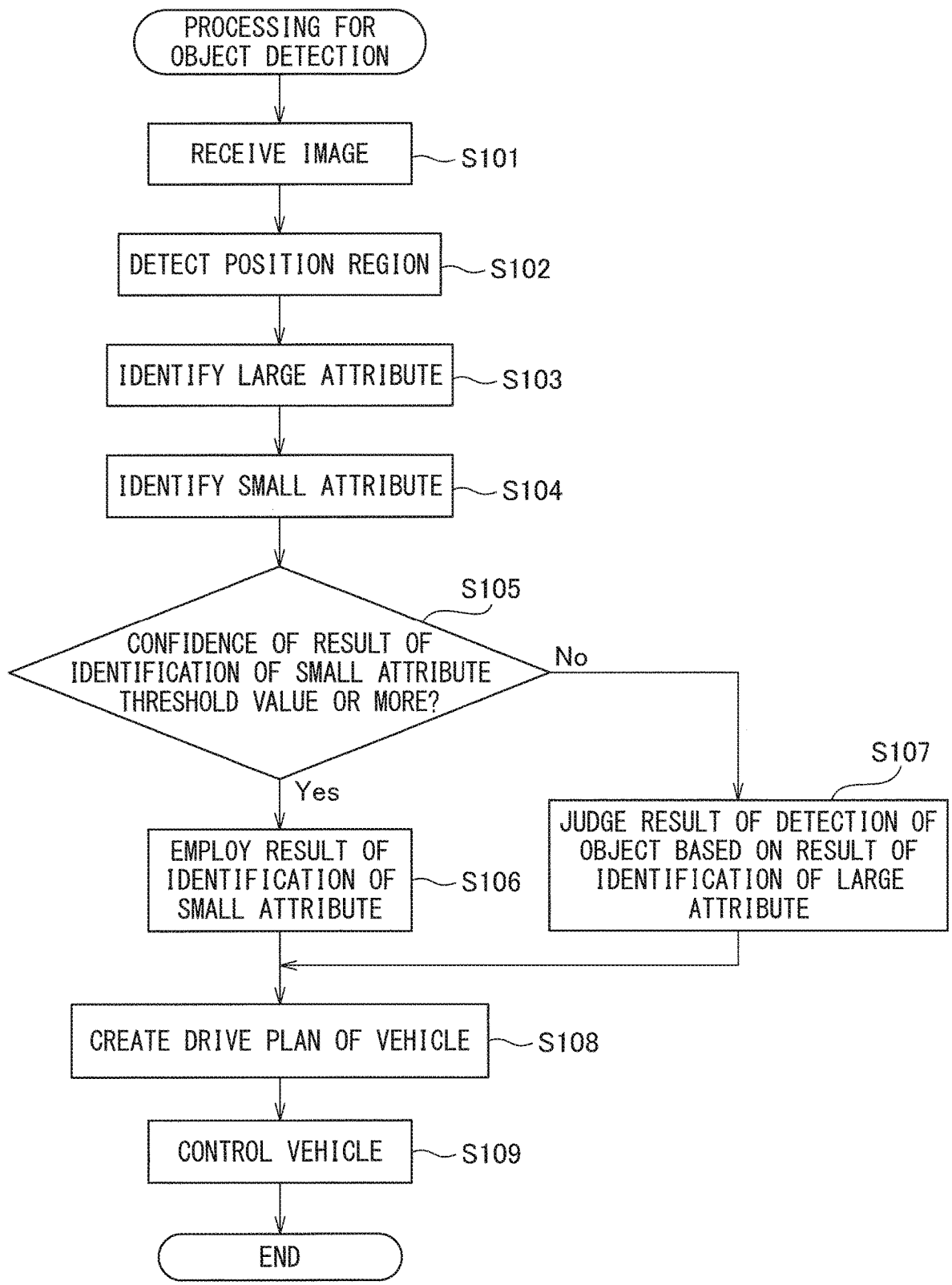
FIG. 7 is a flow chart showing a control routine of processing for vehicle control in the present embodiment.

Below, referring to the flow chart of FIG. 7, processing for vehicle control including processing for object detection will be explained in detail. FIG. 7 is a flow chart showing a control routine of processing for vehicle control in the present embodiment. The present control routine is repeatedly performed by the ECU 3 at predetermined execution intervals. The predetermined execution intervals are, for example, intervals at which the camera 2 sends an image to the ECU 3.

At step S101 to S107, the processing for object detection is performed. First, at step S101, the position region detecting part 31, the large attribute identification part 32, and the small attribute identification part 33 receive an image from the camera 2.

Next, at step S102, the position region detecting part 31 uses the first neural network to detect the position region of the object in the image. Specifically, the position region detecting part 31 inputs the image data to the first neural network and makes the first neural network output the position region of the object.

Next, at step S103, the large attribute identification part 32 uses the second neural network to identify the large attribute of the object in the image. Specifically, the large attribute identification part 32 inputs the image data to the second neural network and makes the second neural network output the large attribute of the object.

The second neural network outputs a confidence (0 to 1) corresponding to each type of predetermined large attribute (vehicle, speed limit sign, warning sign, fallen object, animal, etc.) The confidence expresses the possibility of the large attribute of the object in the image being a large attribute of the type to which this confidence is assigned, and shows that the higher the value of the confidence, the more accurately the large attribute of the object in the image is identified. Further, the total of all types of confidences becomes "1". Note that, if the position region detecting part 31 detects a plurality of position regions, the large attribute identification part 32 identifies the large attributes of objects for each of the plurality of position regions.

Next, at step S104, the small attribute identification part 33 uses the third neural network to identify the small attribute of the object in the image. Specifically, the small attribute identification part 33 inputs the image data to the third neural network and makes the third neural network output the small attribute of the object.

The third neural network outputs a confidence (0 to 1) corresponding to each type of predetermined small attribute (passenger car, bus, truck, etc., if the large attribute is a vehicle). The confidence expresses the possibility of the small attribute of the object in the image being a small attribute of the type to which this confidence is output, and shows that the higher the value of the confidence, the more accurately the small attribute of the object in the image is identified. Further, the total of all types of confidences becomes "1". Note that, if the position region detecting part 31 detects a plurality of position regions, the small attribute identification part 33 identifies the small attributes of objects for each of the plurality of position regions.

Next, at step S105, the object judging part 34 judges whether the confidence of the result of detection of the small attribute by the small attribute identification part 33 is equal to or more than a threshold value. The threshold value is predetermined and, for example, is set to a value of 0.6 to 0.9. Note that, the "result of detection of the small attribute" is the type of small attribute at which the third neural network outputs the maximum confidence.

If at step S105 it is judged that the confidence of the result of detection of the small attribute is equal to or more than the threshold value, the present control routine proceeds to step S106. At step S106, the object judging part 34 employs the result of detection of the small attribute as the result of detection of the object. That is, the object judging part 34 judges that the result of detection of the small attribute is the result of detection of the object.

On the other hand, if at step S105 it is judged that the confidence of the result of detection of the small attribute is less than the threshold value, the present control routine proceeds to step S107. At step S107, the object judging part 34 judges the result of detection of the object based on the result of detection of the large attribute by the large attribute identification part 32. Note that, the "result of detection of the large attribute" is the type of large attribute at which the second neural network outputs the maximum confidence.

For example, the object judging part 34 judges that the result of detection of the large attribute is the result of detection of the object. By doing this, an outline of the object can be grasped and an object can be kept from remaining undetected.

Further, the object judging part 34 may judge the result of detection of the object based on the result of detection of the large attribute and the distribution of confidences of the small attributes. By doing this as well, it is possible to keep an object from remaining undetected.

For example, if the result of detection of the large attribute is a speed limit sign, the object judging part 34 may calculate the average value of the small attributes identified by the small attribute identification part 33 based on the distribution of confidences of the small attributes and judge that the calculated average value of the small attributes is the result of detection of the object. For example, if the confidences of the speed limit signs of 30 km/h, 60 km/h, and 80 km/h are respectively 0.1, 0.5, and 0.4, the average value of the small attributes becomes the speed limit sign of 62.3 km/h (30× 0.1+60×0.5+80×0.4=62.3). Note that, the one's place or the first decimal place of the average value of the small attributes may be rounded off.

Further, if the result of detection of the large attribute is a vehicle, the object judging part 34 may calculate the average value of the magnitudes of small attributes identified by the small attribute identification part 33 (for example, passenger car, truck, and bus) based on the distribution of confidences of the small attributes and judge that the vehicle having the magnitude of the calculated average value is the result of detection of the object. In this case, the magnitude of each small attribute is stored in advance in the memory 22 of the ECU 3.

Further, if the result of detection of the large attribute is a speed limit sign, the object judging part 34 may judge the speed limit sign of the slowest speed in the candidates of the small attribute to be the result of detection of the object. For example, if the candidates of the small attribute are 30 km/h, 60 km/h, and 80 km/h speed limit signs, the object judging part 34 judges that the 30 km/h speed limit sign is the result of detection of the object. By doing this, it is possible to keep the object from remaining undetected while improving the safety of automated driving of the vehicle 10 by the vehicle control system 1.

The candidates of the small attribute are, for example, preset types of small attributes in the third neural network of the small attribute identification part 33. Further, the candidates of the small attribute may be determined from the current position of the vehicle 10 and map information. For example, if the road on which the vehicle 10 is driven is a predetermined highway, all of the speed limits able to be present on the highway are made candidates of the small attribute. The current position of the vehicle 10 is detected by a GPS receiver provided at the vehicle 10, and the map information is stored in advance in the memory 22.

Further, the candidates of the small attribute may be determined from the speeds of other vehicles around the vehicle 10. For example, the speeds of all other vehicles whose speeds are detected may be made candidates for the small attribute. The speeds of other vehicles are detected using a speed sensor provided in the vehicle 10, a camera 2 able to detect the relative speed between the vehicle 10 and other vehicles, a milliwave radar or laser radar, etc.

After step S106 or step S107, at step S108, the drive planning part 35 creates a drive plan of the vehicle 10 based on the result of detection of the object. For example, if the result of detection of the object is an 80 km/h speed limit sign, the drive planning part 35 sets the target speed of the vehicle 10 so that the speed of the vehicle 10 does not exceed 80 km/h. Further, if the result of detection of the object is a vehicle, fallen object, or other obstacle, the drive planning part 35 sets the driving path, target speed, etc., of the vehicle 10 so that the vehicle 10 does not contact the obstacle.

Next, at step S109, the vehicle control part 36 controls the vehicle 10 so that the vehicle 10 drives according to the drive plan created by the drive planning part 35. Specifically, the vehicle control part 36 operates the various actuators of the vehicle 10 (throttle valve, motor, steering system, brake actuator, etc.) to control the acceleration, steering, and braking of the vehicle 10. After step S109, the present control routine is ended.

Above, preferred embodiments according to the present invention were explained, but the present invention is not limited to these embodiments and may be corrected and changed in various ways within the language of the claims. For example, the vehicle control part 36 may control only a part of the acceleration, braking, and steering of the vehicle 10.

Figure 8:
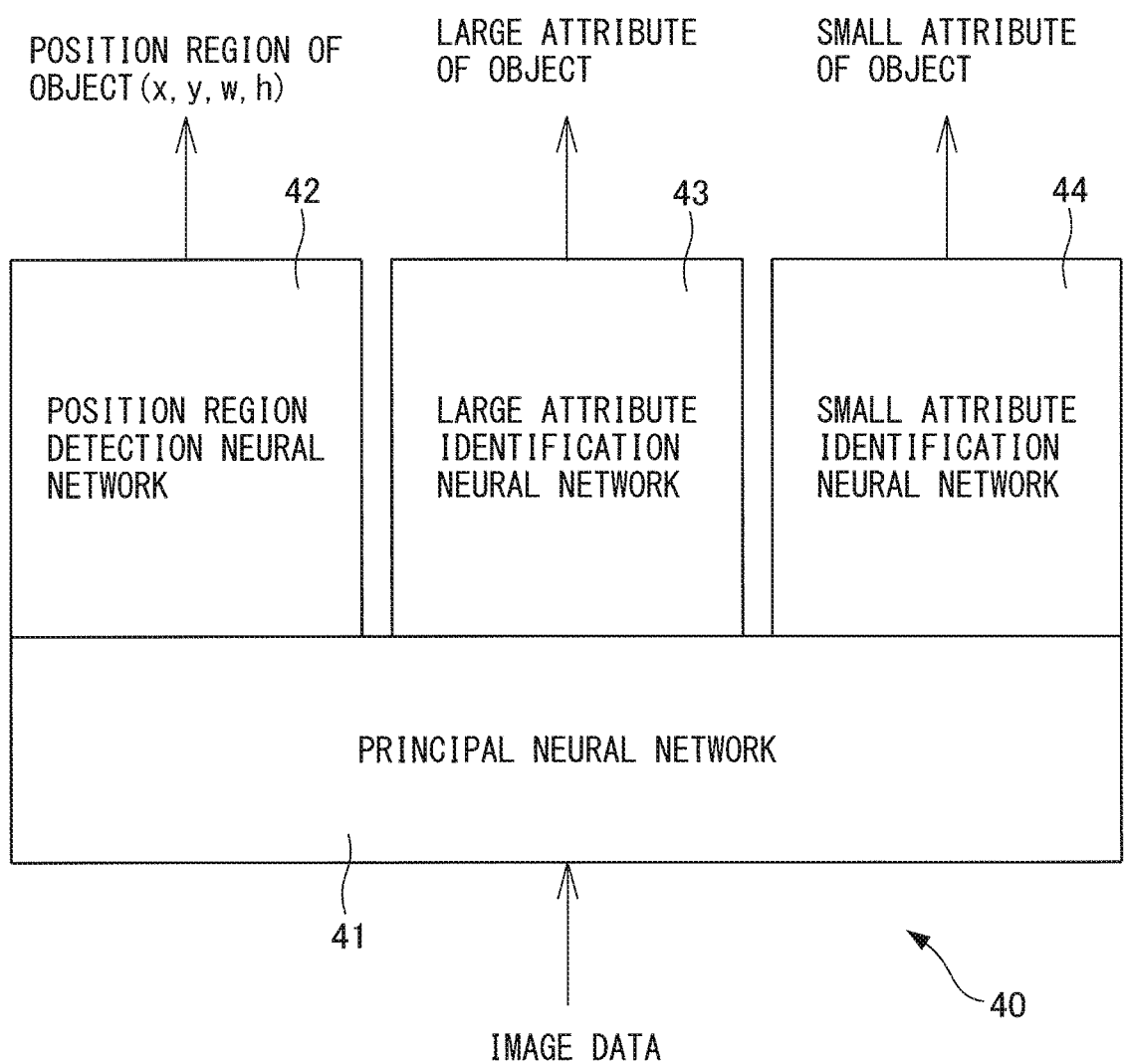
FIG. 8 is a view showing another example of the configuration of a neural network utilized as a classifier.

Further, as shown in FIG. 8, the small attribute identification NN 44 may be connected in series to the principal NN 41 and the large attribute identification NN 43 may be connected in parallel to the small attribute identification NN 44. In this case, the third neural network of the small attribute identification part 33 is comprised of the principal NN 41 and small attribute identification NN 44.

Further, a computer program realizing the functions of the object detection device 30 may be provided in a form recorded in a computer readable portable recording medium such as a semiconductor memory, magnetic recording medium, or optical recording medium.

Further, the object detection device 30 may be mounted in something other than a vehicle. For example, the object detection device 30 may be mounted in a server etc., and detect an object from an image generated by a monitoring camera installed at the inside or outside of a building or a camera mounted in a drone. Further, instead of the ECU 3, the GPU (graphics processing unit) may have the position region detecting part 31, the large attribute identification part 32, the small attribute identification part 33, and the object judging part 34.

REFERENCE SIGNS LIST 1. vehicle control system
3. electronic control unit (ECU)
10. vehicle
30. object detection device
31. position region detecting part
32. large attribute identification part
33. small attribute identification part 34. object judging part
35. drive planning part
36. vehicle control part

The invention claimed is:

1. An object detection device comprising:
a processor, said processor comprising:
a position region detecting part configured to use a first neural network to detect a position region of an object in the image,
a large attribute identification part configured to use a second neural network to identify a large attribute of the object,
a small attribute identification part configured to use a third neural network to identify a small attribute of the object which is a lower concept of the large attribute, and
an object judging part configured to judge a result of detection of the object,
wherein
the object judging part is configured to judge that a result of identification of the small attribute is the result of detection if a confidence of the result of identification of the small attribute by the small attribute identification part is equal to or more than a threshold value, and judge the result of detection based on a result of identification of the large attribute if the confidence is less than the threshold value,
wherein the object judging part is configured to judge that a speed limit sign of a slowest speed in candidates of the small attribute is the result of detection if the confidence is less than the threshold value and the result of identification of the large attribute by the large attribute identification part is a speed limit sign.

2. The object detection device according to claim 1, wherein the object judging part is configured to judge the result of detection based on the result of identification of the large attribute and a distribution of confidence of the small attribute if the confidence is less than the threshold value.

3. A vehicle control system comprising
an object detection device according to claim 1,
a drive planning part configured to create a drive plan of a vehicle based on the result of detection of the object, and
a vehicle control part configured to control the vehicle so that the vehicle drives in accordance with a drive plan prepared by the drive planning part.

4. A method of detection of an object comprising:
providing a processor having a first neural network, a second neural network and a third neural network,
using the first neural network to detect a position region of an object in an image,
using the second neural network to identify a large attribute of the object,
using the third neural network to identify a small attribute of the object which is a lower concept of the large attribute,
when a confidence of a result of identification of the small attribute is equal to or more than a threshold value, judging that the result of identification of the small attribute is a result of detection of the object and, when the confidence is less than the threshold value, judging the result of detection based on a result of identification of the large attribute, and judging that a speed limit sign of a slowest speed in candidates of the small attribute is the result of detection if the confidence is less than the threshold value and the result of identification of the large attribute by the large attribute identification part is a speed limit sign.

5. A non-transitory computer-readable medium storing an object detection use computer program making a computer having a processor:
use a first neural network to detect a position region of an object in an image,
use a second neural network to identify a large attribute of the object,
use a third neural network to identify a small attribute of the object which is a lower concept of the large attribute, and,
when a confidence of a result of identification of the small attribute is equal to or more than a threshold value, judge that the result of identification of the small attribute is a result of detection of the object and, when the confidence is less than the threshold value, judge the result of detection based on a result of identification of the large attribute, and judge that a speed limit sign of a slowest speed in candidates of the small attribute is the result of detection if the confidence is less than the threshold value and the result of identification of the large attribute by the large attribute identification part is a speed limit sign.

6. An object detection device having a processor configured to:
use a first neural network to detect a position region of an object in the image,
use a second neural network to identify a large attribute of the object,
use a third neural network to identify a small attribute of the object which is a lower concept of the large attribute,
judge a result of detection of the object, judge that a result of identification of the small attribute is the result of detection if a confidence of the result of identification of the small attribute is equal to or more than a threshold value, and judge the result of detection based on a result of identification of the large attribute if the confidence is less than the threshold value, and
judge that a speed limit sign of a slowest speed in candidates of the small attribute is the result of detection if the confidence is less than the threshold value and the result of identification of the large attribute by the large attribute identification part is a speed limit sign.

* * * * *